United States Patent [19]

Hirotsuka et al.

[11] Patent Number: 4,771,126

[45] Date of Patent: Sep. 13, 1988

[54] METHOD FOR FRACTIONATION OF VEGETABLE PROTEINS BY REDUCTION

[75] Inventors: Motohiko Hirotsuka, Izumisano; Masahiko Terashima; Hitoshi Taniguchi, both of Osaka, all of Japan

[73] Assignee: Fuji Oil Company, Ltd., Osaka, Japan

[21] Appl. No.: 63,748

[22] Filed: Jun. 19, 1987

Related U.S. Application Data

[63] Continuation of Ser. No. 826,389, Feb. 5, 1986, abandoned.

[30] Foreign Application Priority Data

Feb. 14, 1985 [JP] Japan ................... 60-27925
Apr. 11, 1985 [JP] Japan ................... 60-77257

[51] Int. Cl.$^4$ ............................... A23J 1/14
[52] U.S. Cl. ..................... 530/378; 204/131; 204/180.1; 426/656; 530/370; 530/372; 530/374; 530/375; 530/376; 530/377
[58] Field of Search .................... 204/180.1, 131; 530/370, 372, 374, 375, 376, 377, 378

[56] References Cited

U.S. PATENT DOCUMENTS

| | | | |
|---|---|---|---|
| 1,245,983 | 11/1917 | Satow | 530/370 |
| 4,208,260 | 6/1980 | Oughton | 530/370 X |
| 4,346,122 | 8/1982 | Orthoefer et al. | 426/656 |
| 4,368,151 | 1/1983 | Howard et al. | 530/378 |
| 4,370,267 | 1/1983 | Lehnhardt et al. | 530/370 X |
| 4,386,110 | 5/1983 | Komeyasu et al. | 204/131 X |
| 4,435,438 | 3/1984 | Lehnhardt et al. | 530/378 X |
| 4,551,274 | 11/1985 | Shen | 530/378 |

OTHER PUBLICATIONS

Cerlal Chem. 42, 71–85 (1965), Roberts et al.
Cerlal Chem. 44, 653–668 (1967), Wolf et al.
Cerlal Chem. 44, 645–652 (1967), Eldridge et al.
Plant Physiology, 56, 19–22 (1975), Thanh et al.
Nippon Shokuhin Kogyo Gakkaishi, 30, No. 10, 589–598 (1983), Komeyasu et al.

*Primary Examiner*—Howard E. Schain
*Attorney, Agent, or Firm*—Wenderoth, Lind & Ponack

[57] ABSTRACT

A method for fraction fractionation of a vegetable protein such as soybean protein which comprises subjecting a source of the vegetable protein in an aqueous system to reduction conditions such as treatment with a sulfite compound, a glutathione compound or cysteine compound, or electrolytic reduction at pH within a neutral or alkaline range and then bringing the system to pH of 5.5 to 7.0 at a temperature of 20° C. or lower to fractionate the system into a soluble or dispersing fraction and an insoluble or precipitate fraction.

11 Claims, 3 Drawing Sheets

METHOD FOR FRACTIONATION OF VEGETABLE PROTEINS BY REDUCTION

This application is a continuation of now abandoned application Ser. No. 826,389 filed Feb. 5, 1986.

FIELD OF THE INVENTION

The present invention relates to a method for fractionation of proteins, particularly, edible vegetable proteins such as soybean protein.

BACKGROUND OF THE INVENTION

The production of a soybean protein isolate has been carried out heretofore by treating a soybean protein source in an aqueous system to fractionate it into a water soluble or dispersing fraction and a water insoluble or precipitate fraction (an insoluble residue called "okara" or "soy pulp"), subjecting the water soluble or dispersing fraction to isoelectric precipitation at pH 4 to 5, usually, at pH 4.2 to 4.6 to form a precipitate, and working up the precipitate by, for example, neutralization and drying to isolate a desired fraction of soybean protein.

Also, like other many vegetable proteins, soybean protein is composed of various protein fractions having complex higher-order structures. For example, in a method for fractionation of soybean protein by ultracentrifugation based on difference in sedimentation constant between protein fractions, soybean protein is fractionated into various protein fractions such as 2S, 7S, 11S, 15S and the like and these fractions have different physical properties. Further, each protein fraction is composed of several subunits. For example, 7S protein fraction has 3 subunits and 11S protein fraction has 12 subunits. Various studies have shown that the natures of these protein fractions and subunits (e.g., higher-order structure, interaction between subunits, etc.) are varied according to alterations in circumstances (e.g., ionic strength, pH, temperature, concentration, etc.), and their properties are also varied.

By utilizing these facts, various methods for fractionation of soybean protein and other vegetable proteins have been proposed. And, in many of these methods, physical, functional and chemical properties of the resultant fractionated and isolated soybean protein products are considerably varied, even if conditions employed (e.g, ionic strength, pH, presence of a certain salt, concentration, temperature, difference in order of operations, etc.) are only slightly changed. These variations result from not only the composition ratio of the above protein fractions such as 7S, 11S and the like, but also higher-order structural change, interaction between protein fractions and/or subunits, and the like.

Among these known methods for fractionation of vegetable proteins, Japanese Patent Laid Open Publication No. 48-56843 discloses fractionation of 11S fraction and 7S fraction of soybean protein by using a diluted calcium salt. Japanese Patent Laid Open Publication No. 49-31843 discloses preparation of 7S fraction of soybean protein by removing an insoluble fraction in the presence of sodium chloride or potassium chloride at pH 1.2 to 4.0. Japanese Patent Laid Open Publication No. 51-86149 discloses extraction of a thermal coagulative viscous protein from an aqueous slurry of a source of vegetable protein such as an oilseed material with water at pH about 5.1 to 5.9. Japanese Patent Laid Open Publication No. 55-124457 discloses preparation of 7S protein fraction from soybeans by extraction at pH 5.40 to 5.85 and isoelectric precipitation at pH 4.5. Japanese Patent Laid Open Publication No. 55-153562 discloses preparation of a soybean protein product by fractionation of soybean protein into 1st fraction at pH 6.0 to 7.0, a 2nd fraction at pH 5.0 to 5.6 and a 3rd fraction at pH 4.0 to 4.8 and respective isolation of the 2nd and the 3rd fractions. Japanese Patent Laid Open Publication No. 56-64755 discloses preparation of a protein product by extraction of vegetable protein with an aqueous extracting medium at pH about 6.5, precipitation at isoelectric point, heating at 115° to 145° F. and concentration of solids content to 44% or more. Japanese Patent Laid Open Publication No. 57-132844 discloses preparation of a protein isolate by extraction of a fraction from an aqueous slurry of vegetable protein at pH 6.5 to 8.0 in the presence of sulfite ion and drying. Japanese Patent Laid Open Publication No. 58-36345 discloses isolation of 7S and 11S fractions by adjusting pH of an aqueous slurry of vegetable protein resulted from isoelectric precipitation to 5.0 to 5.6, and adjusting a salt concentration to 0.01 to 0.2M.

Further, experimental methods for fractionation of soybean protein have been reported by Roberts, R. C. and Briggs, D. R., Cereal Chem., 42: 71–85 (1965): Eldrige, A. C. and Wolf, W. J., Cereal Chem., 44: 645–652 (1967): Wolf, W. J. and Sly, D. A., Cereal Chem., 44: 653–668 (1967): and Thanh, V. H. et al, Plant Physiol., 56, 19–22(1975). Particularly, the report of Thanh, V. H. discloses fractionation of 7S globulin of soybean protein by extraction of soybean meal with a Tris-buffer solution containing beta-mercaptoethanol (pH 7.8), centrifugation at 10,000 r.p.m. to remove insoluble materials, adjustment of the pH of the supernatant to 6.6, dialysis, centrifugation at 10,000 r.p.m. to fractionate into a crude 11S fraction and a crude 7S fraction, isoelectric precipitation of the 7S fraction, washing, and then lyophilization. Yamauchi, F. et al, Agric. Biol. Chem., 39, (1975) report the isolation of 11S fraction of soybean protein from the same crude 11S fraction as that in Thanh et al by washing, neutralization and dissolution in a buffer solution.

However, these known methods for fractionation of vegetable protein are insufficient for industrial purpose, particularly, for application in the industrial production of a soybean protein isolate.

In order to overcome such a drawback of the known methods, the present inventors have made intensive studies. According to the present inventors' study, various problems are involved in the known methods. For example, (1) the fractionation of a crude 7S fraction and a crude 11S fraction is hardly expected by mere substitution of an inorganic acid and the like for the Tris-buffer solution to adjust pH; (2) a chemical agent such as the Tris-buffer solution and beta-mercaptoethanol can not be used in the food industry; (3) particularly, beta-mercaptoethanol has a strong unpleasant odor and is impossible to use in foodstuffs; and (4) it is difficult to successfully separate a solution part (crude 7S fraction) from a precipitated slurry (crude 11S fraction) with an industrial continuous centrifuge of low centrifugal force (e.g., decanter) because the solution obtained by adjusting pH to 6.6 after separation of the insoluble material by centrifugation has a very high viscosity.

It has been found that these problems can be solved by (1) treating a vegetable protein source in an aqueous system with a sulfite compound, a glutathione compound or a cysteine compound at pH 6.5 or higher, and then (2) bringing the system to pH 5.5 to 7.0 at a temperature of 20° C. or lower to fractionate into a soluble or dispersing fraction and an insoluble or precipitate fraction. According to this procedure, protein products having excellent flavor and taste which show different properties each from the other can be obtained. Particularly, when soybean protein containing soybean carbohydrate is used, separation can be readily carried out by using an industrial continuous centrifuge (e.g., decanter).

Further, it has been also found that fractionation of 7S protein fraction and 11S protein fraction can be readily and efficiently carried out in an industrial scale without the above problems by subjecting a vegetable protein source in an aqueous system to electrolytic reduction. In this regard, although Komeyasu, M., et al, Nippon Shokuhin Kogyo Gakkaishi Vol. 30, No. 10, 589-598 (1983) disclose electrolytic reduction of soybean protein, they do not suggest the separation of 7S protein fraction and 11S protein fraction by electrolytic reduction.

OBJECTS OF THE INVENTION

One object of the present invention is to provide a novel method for fractionation of soybean protein, which can be applied to an industrial scale production of a soybean protein isolate.

Another object of the present invention is to provide a novel method for fractionation of other vegetable proteins, which can be applied to an industrial scale production of such protein products.

Still another object of the present invention is to provide a novel method for fractionation of 7S fraction and 11S fraction of vegetable protein.

These objects as well as other objects and advantages of the present invention will become apparent to those skilled in the art from the following description by reference to the accompanying drawings.

SUMMARY OF THE INVENTION

Figure 1:
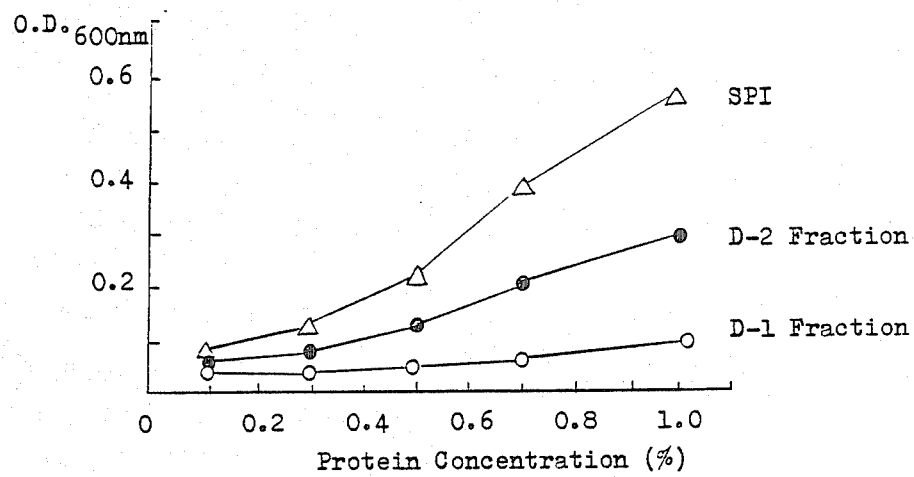
FIG. 1 is a graph illustrating the relationship between the concentration and the turbidity of an aqueous suspension of each protein fraction obtained in Example 1 hereinafter.

According to the first aspect of the present invention, there is provided a method for fractionation of vegetable protein which comprises treating a source of the vegetable protein in an aqueous system with a sulfite compound, a glutathione compound or a cysteine compound at pH of 6.5 or higher bringing the resulting mixture to pH 5.5 to 7.0 at a temperature of 20° C. or lower to fractionate into a soluble or dispersing fraction (sometimes, hereinafter merely referred to as a soluble fraction) and an insoluble or precipitate fraction (sometimes, hereinafter merely referred to as an insoluble fraction). These fractions can be readily isolated by a conventional separation technique such as filtration or centrifugation, particularly, by a continuous industrial centrifuge (e.g., decanter). Each isolated fraction can be purified by a conventional technique such as washing, isoelectric precipitation, neutralization, drying, etc.

In the second aspect of the present invention, there is provided an improved method for fractionation of vegetable protein into fractions mainly composed of 7S and 11S protein fractions, respectively, which comprises subjecting a source of the vegetable protein containing 7S and 11S protein fractions in an aqueous system to electrolytic reduction, preferably at pH within a neutral or alkaline range. In this aspect, the electrolytic reduction can be carried out in the presence of a small amount of a sulfite compound, a glutathione compound or a cysteine compound such as that used in the above first aspect, or a sulfate compound. Further, the mixture thus treated can be brought to pH 5.5 to 7.0 at a temperature of 20° C. or lower to fractionate into a soluble fraction which is mainly composed of 7S protein fraction and an insoluble fraction which is mainly composed of 11S protein fraction. Likewise, according to a conventional technique, these fractions can be readily isolated and each isolated fraction can be purified.

Thus, as is clear from the above description, in the third aspect of the present invention, there is provided a method for fractionation of vegetable protein which comprises subjecting a source of the vegetable protein in an aqueous system to a reduction reaction at pH within a neutral or alkaline range, and then bringing the mixture to pH 5.5 to 7.0 at a temperature of 20° C. to fractionate into a soluble fraction and an insoluble fraction.

DETAILED EXPLANATION OF THE INVENTION

In the present invention, any material which contains the desired protein fraction or fractions of vegetable protein can be used as the source of vegetable protein. Examples of the source of vegetable protein used in the present invention include oilseeds such as soybean, ripeseed, peanut, cottonseed and the like, and protein containing materials derived from these oilseeds. In view of availability and economical reasons, it is preferable to use soybean and other protein containing materials derived from soybean, for example, rolled soybean, defatted soybean, soymilk (including dehydrated soymilk), soybean protein concentrate, soybean protein isolate.

Particularly, in the first aspect of the present invention, it is preferable to use the source containing the desired soybean protein fractions together with insoluble carbohydrates such as "okara" (e.g., soybean itself, defatted soybean, soybean protein concentrate, etc.) because separation of the soluble fraction and the insoluble fraction is more readily performed. In the second aspect of the present invention, it is preferable to use the source containing less insoluble carbohydrates (e.g., soymilk). However, insoluble materials in the source of vegetable protein can be removed at any stage of the method of the present invention. For example, insoluble materials can be removed from the source before carrying out the method of the present invention or they can be removed after bringing the aqueous system to pH 5.5 to 7.0 to fractionate into a soluble fraction and an insoluble fraction.

In the first aspect of the present invention, the source of vegetable protein is treated with a sulfite compound, a glutathione compound or a cysteine compound.

The sulfite compound may be any compound which can release sulfite ion in the aqueous system. Examples of the sulfite compound include sulfurous acid, alkali metal sulfites (e.g., potassium sulfite and sodium sulfite), ammonium sulfite, alkali metal bisulfites (e.g., potassium bisulfite and sodium bisulfite), ammonium bisulfite, alkali metal pyrosulfite (e.g., potassium pyrosulfite and sodium pyrosulfite), ammonium pyrosulfite, alkali metal meta bisulfites (e.g., potassium meta bisulfite and sodium meta bisulfite), ammonium meta bisulfite, a mixture thereof and sulfur dioxide. The amount of the sulfite compound to be used is varied according to the protein content of the source, but, usually, it is preferable to use the sulfite compound in the amount of 0.5% by weight or more, more preferably, 1.0% by weight or more based on the soybean protein source. When the amount of the sulfite compound is less than 0.5% by weight, the purity of protein in the resulting soluble fraction (i.e., specificity of protein in the resulting soluble fraction) is lowered. In view of economic reasons and effect of the compound, it is sufficient to use the sulfite compound in the amount of, at most, 1.0% by weight based on the soybean protein source.

Examples of the glutathione compound and the cysteine compound include glutathione, a salt of glutathione such as glutathione hydrochloride, cysteine, and a salt of cysteine such as cysteine hydrochloride. Usually, these compounds can be used in the amount of 5 m moles or more, preferably, 10 m moles or more per 100 g of the soybean protein source. It is sufficient to use these compound in the amount of, at most, 50 m moles per 100 g of the soybean protein source. In comparison with mercaptoethanol used in a conventional method, these compounds do not show any strong odor and they give fractions having excellent taste and flavor without any hygienic problem.

The treatment of the protein source with the above compound is carried out in an aqueous system, such as a dispersion or a suspension of the protein source, at pH of 6.5 or higher, preferably, 7.1 to 9, more preferably, 7.5 to 8.5. The pH of the system can be adjusted by a conventional technique, for example, by using an alkaline compound such as sodium hydroxide, sodium carbonate, etc. and an acid such as hydrochloric acid. When pH is less than 6.5, the above compound does not show any effect and the yield of the soluble fraction is lowered. On the other hand, when pH is higher than 9, a distinctive odor due to the alkaline conditions may be produced. The treatment can be carried out by using a known mixing or stirring apparatus suitable for dissolving and extracting protein from the protein source. The concentration of the protein source in the aqueous system is not specifically limited and, when the concentration is lower, dissolution and extraction of protein is more readily effected. However, when the concentration of the protein source is too low, separation of the insoluble fraction from the soluble fraction becomes difficult. Accordingly, it is preferable to use the protein source in a concentration of 3% by weight or higher, usually, 8 to 20% by weight based on the total weight of the aqueous system.

In the second aspect of the present invention, the protein source is subjected to electrolytic reduction in an aqueous system. That is, the protein source is maintained under reducing conditions produced about a cathode by electrolytic reduction. The aqueous system can be the same as that in the first aspect of the present invention.

This electrolytic reduction can be carried out by using a known electrolytic reduction apparatus. In general, such an apparatus comprises a cathode cell having a cathode, an anode cell having an anode, and a diaphragm separating or bridging the cells. Any diaphragm of a material permeable to an ion can be used. For example, an ultrafiltration membrane (UF), a reverse osmosis membrane (RO), a semipermeable membrane, a ceramics material such as a clay plate or cylinder, or a high molecular weight material in the shape of gel or a membrane such as agar containing an electrolyte can be used. The protein source in the aqueous system is added to the cathode cell and, according to a conventional technique, a reduction reaction is carried out. The pH of the aqueous system in the cathode cell is preferably within a neutral to alkaline range.

The degree and the rate of the reduction reaction can be readily controlled by adjusting the electric current density, the electrode potential or the electrolytic reduction time. For example, when the reduction reaction is carried out at 100 mA of electric current per 100 ml of soymilk, it takes about 6 hours to obtain the desired degree of reaction. In this case, when the current density and the electrode potential are increased, the electrolytic reduction can be decreased.

Further, electrolytic reduction time can be also decreased by addition of a small amount of material which has a low oxidation-reduction potential or makes its oxidation-reduction potential low under electrolytic reduction conditions. Examples of such a material include the sulfite compound, the glutathione compound and the cysteine compound as described above as well as a sulfate compound which can release sulfate ion in the aqueous system (e.g., sodium sulfate). For example, when sodium bisulfite (SBS) is used in an amount of 10 mg per 100 ml of soymilk, the same degree of the reduction as in the above 6 hour reaction can be obtained by a reaction for about 4 hours, and, when 60 mg of SBS is used, the same degree of the reduction can be obtained by a reaction for about 2 hours.

The second aspect of the present invention has the following advantages. (1) The fractionation of vegetable protein can be carried out without or with a very small amount of a chemical substance which is not suitable for use in food: (2) The aqueous system can be maintained at pH of a neutral or alkaline range without addition of any alkaline material because the pH of the system becomes this range under electrolytic reduction conditions and (3) The fraction mainly composed of 7S protein fraction and that mainly composed of 11S protein fraction can be readily separated.

As is clear from the above description, in the method of the present invention, the source of vegetable protein is treated in the aqueous system under reducing conditions, preferably, at pH within a neutral or alkaline range.

The aqueous system thus treated under reducing conditions according to the first or second aspect of the present invention is subsequently brought to pH 5.5 to 7.0, preferably, 6.0 to 6.9 at a temperature of 20° C. or lower to fractionate into a soluble fraction which is mainly composed of 7S protein fraction (hereinafter referred to as S-1 fraction) and an insoluble fraction which is mainly composed of 11S fraction (hereinafter referred to as P-1 fraction). When pH is lower than 5.5, the yield of S-1 fraction is lowered and, when pH is higher than 7.0, precipitation of P-1 fraction becomes difficult and the purity of S-1 fraction becomes low. When the temperature is higher than 20° C., separation of S-1 and P-1 fractions becomes difficult. The temperature must be kept above the freezing point of the aqueous system to be treated because, when the system is frozen, separation of the fractions becomes difficult.

Separation of the fractions can be carried out by a known technique such as filtration, membrane separation, centrifugation and the like. Particularly, continuous separation of S-1 and P-1 fractions can be readily carried out by using a continuous centrifuge (e.g., decanter, nozzle separator, etc.) and the like. Of course, a batchwise centrifuge can be also employed. If pH of the aqueous system is not brought to pH 5.5 to 7.0 after treatment under reducing conditions, separation of S-1 and P-1 fractions becomes very difficult, unless a high centrifugal force such as about 10,000 r.p.m. which is much higher than that of an industrial centrifuge as a decanter (about 2,000 to 2,500 r.p.m.) is applied.

S-1 fraction thus obtained contains water soluble ingredients other than 7S protein fraction such as whey and, it can be used as a 7S protein milk as it is. Optionally, these ingredients can be separated by a known technique to obtain a crude 7S protein fraction.

When P-1 contains insoluble materials such as "okara", it can be used as a 11S protein concentrate as it is. Optionally, the insoluble materials can be separated by a known technique to obtain a crude 11S protein fraction. Preferably, the insoluble materials can be separated by taking P-1 fraction thus obtained a warm aqueous system to obtain a fraction wherein 11S protein fraction is dispersed or dissolved (hereinafter referred to as S-2 fraction). In order to obtain a good dispersion or solution state of S-2 fraction, the temperature of the warm aqueous system should be 11° C. or higher, preferably, 21° C. or higher, more preferably, 30° to 60° C. and pH of the system should be 6 or higher, preferably, 6.7 to 9. The S-2 fraction can be used as it is as a crude 11S protein fraction.

Further, S-1, P-1 and S-2 fractions thus obtained can be concentrated or dried according to a known technique to use as a vegetable protein isolate which has properties different from those of a conventional protein isolate. For example, each fraction can be concentrated by subjecting it to an isoelectric precipitation, recovering the resulting precipitate, and, optionally, washing the precipitate with water to remove contaminated materials. An ultrafiltration membrane can be used for this concentration. Alternatively, each fraction can be concentrated by subjecting it to an isoelectric precipitation, neutralizing the resulting precipitate, subjecting the precipitate to heat sterilization according to a known technique such as a HTST or UHT process, and, optionally, subjecting the resultant to an enzymatic treatment. Usually, it is preferable to isolate the desired product in the form of a sterilized and dried material.

Since the resulting isolated product shows different properties in comparison with a conventional product as shown in the experiment hereinafter, wide application thereof can be found.

The following Examples, Reference Examples and Experiments further illustrate the present invention in detail but are not to be construed to limit the scope thereof. In the Examples, Reference Examples and Experiments, all "parts" are by weight unless otherwise stated.

EXAMPLE 1

A mixture of defatted soybean (90 parts), water (900 parts) and sodium bisulfite (1.26 parts) were stirred at pH 7.8 for 30 minutes. To the mixture was added 6N hydrochloric acid to adjust pH thereof to 6.25 and the mixture was allowed to stand at 5° C. or lower with ice cooling for 30 minutes. The mixture was centrifuged with a decanter at 2,500 r.p.m. to fractionate into a soluble fraction (S-1 fraction) and an insoluble fraction (P-1). S-1 fraction was subjected to isoelectric precipitation at pH of 4.5 to separate a precipitate. To the precipitate was added water (500 parts) and the mixture was stirred, washed with water and then centrifuged under the same conditions as described above to obtain a precipitate fraction. This fraction was neutralized, heated at 135° C. for 30 seconds and then spray-dried to obtain a dried material (12.6 parts, hereinafter referred to as D-1 fraction).

On the other hand, the above-obtained P-1 fraction was added to warm water (500 parts) at pH 8.0 at 50° C. and the resulting precipitate was removed with a decanter to obtain a fraction (hereinafter referred to as S-2 fraction). S-2 fraction was adjusted to pH 4.5 and subjected to isoelectric precipitation. The resulting precipitate was neutralized, heated and spray-dried to obtain a dried material (12.8 parts, hereinafter referred to as D-2 fraction).

No unpleasant odor was observed during the production and the products, S-1, S-2, D-1 and D-2 fractions.

EXPERIMENT 1

Properties of D-1 and D-2 fraction obtained in Example 1 and those of a soybean protein isolate (SPI) obtained by the following conventional method were compared.

Preparation of SPI

To defatted soybean as used in Example 1 (1 part) was added water (10 parts) and the mixture was stirred and centrifuged to remove "okara". The resulting soymilk was subjected to isoelectric precipitation to obtain a curd, and water (10 parts) was added to the curd. The mixture was washed with water and neutralized and, according to the same procedure as in Example 1, heating and spray drying were carried out to obtain SPI.

Measurement of Nitrogen Solubility Index (NSI)

A sample (3.5 g) was dispersed in water (100 ml) and stirred (450 r.p.m.) at 40° C. for 60 minutes. The mixture was centrifuged at 2,500 r.p.m. to separate the supernatant. The precipitate was again treated by the same procedure to separate the supernatant. Both supernatants were combined and the content of crude protein in the mixture was determined by Kjeldahl method. NSI was represented by the percentage of the crude protein content of the combined supernatant to that of the whole sample.

As the results, NSI of D-1 fraction was 92 and that of D-2 was 93. These NSI values were as high as that of SPI.

Measurement of gel formation and viscosity

To a powder sample (12 g) was added water or 2.5% NaCl solution (88 ml) and the mixture was homogenized at 1,200 r.p.m. for 3 minutes, subjected to defoaming with centrifugation at 2,500 r.p.m. for 10 minutes and heated at 80° C. for 30 minutes. Gel strength (g/cm$^2$) of the resultant gel was measured by a curd meter (manufactured by IIO K.K. in Japan) or viscosity (cps) of the resultant gel was measured by a Brookfield viscometer (manufactured by Tokyo Keiki K.K. in Japan). The results are shown in Table 1.

TABLE 1

|  | Gel without NaCl | Gel with NaCl |
| --- | --- | --- |
| D-1 fraction | 61 g/cm$^2$ | J100,000 cps |
| D-2 fraction | 91 g/cm$^2$ | 4,480 cps |
| SPI | 74 g/cm$^2$ | J100,000 cps |

As shown in Table 1, D-1 fraction gives a brittle gel when NaCl is added and shows a high viscosity when NaCl is not added. On the other hand, D-2 fraction shows a high gel strength when NaCl is added and shows a low viscosity when NaCl is not added.

Measurement of transparency

The turbidity (O.D.) of an aqueous suspension containing D-1 fraction, D-2 fraction or SPI in a different concentration was measured at 600 nm. The relationship between the concentration and the turbidity of each fraction or SPI is shown in FIG. 1.

As is shown by these experiments, in comparison with SPI, both D-1 and D-2 fractions are different in gel formation, viscosity, transparency and the like. Also the D-2 fraction can form a white hard gel which resembles to so-called "kamaboko", a typical Japanese fish paste product.

EXAMPLE 2

Figure 2:
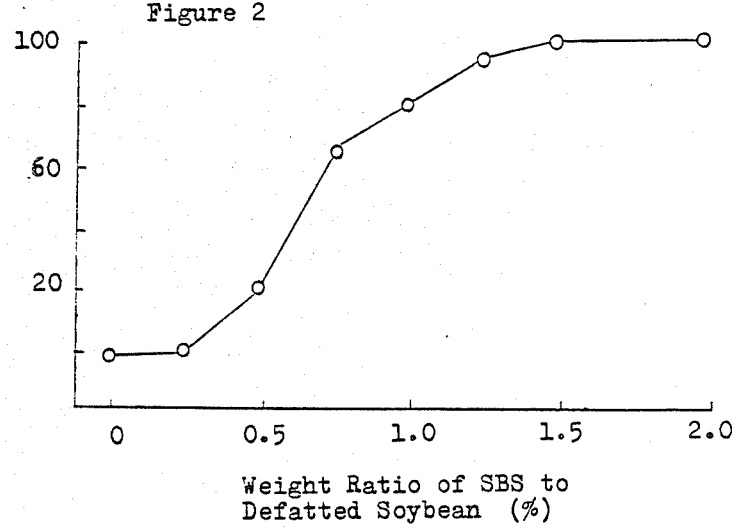
FIG. 2 is a graph illustrating the relationship between the yield of a protein fraction obtained in Example 1 hereinafter and the ratio of sodium bisulfite to defatted soybean.

According to the same procedure as in Example 1, D-2 fraction was prepared with varying the weight ratio of the amount of sodium bisulfite to that of defatted soybean. The relationship between the yield of D-2 fraction and the weight ratio is shown in FIG. 2. In FIG. 2, the yield is expressed by a relative value by taking the yield of D-2 fraction in Example 1 as 100.

As is seen from FIG. 2, at least 0.5% by weight, preferably, 1.0% by weight or more of sodium bisulfite based on defatted soybean is required. Further, it is clear that separation of D-1 and D-2 fractions becomes difficult, when no sodium bisulfite is used.

EXAMPLE 3

According to the same procedure as in Example 1, D-1 and D-2 fractions were prepared except that 15 m mole of cysteine hydrochloride or glutathione per 100 g of defatted soybean was substituted for sodium bisulfite. The yield of D-2 fraction is shown in Table 2. In Table 2, the yield is expressed by a relative value by taking the yield of D-2 fraction in Example 1 as 100.

TABLE 2

|  | Yield of D-2 Fr. |
| --- | --- |
| Example 1 | 100 |
| Cysteine hydrochloride | 88 |
| Glutathione | 97 |

REFERENCE EXAMPLE 1

To defatted soybean (1 part) was added a 63 mM Tris HCl-buffer solution containing 10 mM beta-mercaptoethanol (pH 7.8, 15 parts) and the mixture was stirred and centrifuged at 10,000 r.p.m. to remove the insoluble fraction ("okara"). The soluble fraction was adjusted to pH 6.6 with 2N hydrochloric acid and allowed to stand at 2° to 3° C. for 3 hours with ice cooling. Separation of the fraction into a dispersed fraction and a precipitate fraction was carried out by using a decanter. However, it was unsuccessful. Then, by using a batchwise centrifuge (10,000 r.p.m.), the fraction was separated into a supernatant (S-1 fraction) and a precipitate. The precipitate was dispersed in a phosphate buffer (pH 7.6) to prepare S-2 fraction. Both S-1 and S-2 fractions had unpleasant odor due to mercaptoethanol and contained the buffer. Accordingly, they were not suitable for use in a foodstuff.

EXAMPLE 4

To defatted soybean was added 15 times volume of water and the mixture was stirred at pH 6.8 for 1 hour to obtain soymilk. The soymilk (300 ml) was placed in a cathode cell of an electrolytic reduction apparatus and 0.4M sodium chloride solution (300 ml) was added to the anode cell. The both cells were connected by a 1.5% agar bridge containing 0.4M sodium chloride. The cathode cell was stirred and electrolytic reduction (electric current: 100 mA/100 ml soymilk) was carried out for up to 8 hours.

Since, with the elapse of the electrolytic reduction time, pH was raised (within 2 hours, pH was raised from 7 to 8.7), pH was adjusted within the range of 7.0 to 7.5 with addition of 2N hydrochloric acid.

Figure 3:
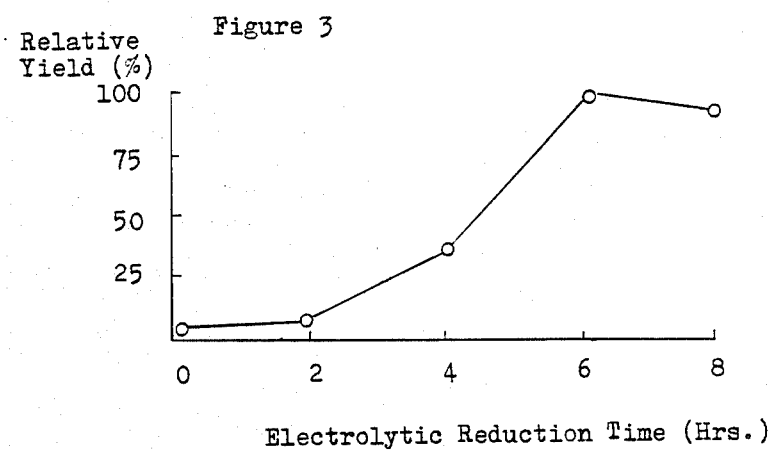
FIG. 3 is a graph illustrating the relationship between the yield of 11S protein fraction obtained in Example 4 hereinafter and the electrolytic reduction time.

After electrolytic reduction, pH of soymilk was adjusted to 6.2 and soymilk was cooled at 10° C. or lower for 2 hours with ice cooling to form a precipitate. The precipitate was recovered by centrifugation at 2,500 r.p.m. and the amount thereof was measured. The relationship between the electrolytic reduction time and the amount of the precipitate recovered are shown in FIG. 3. In FIG. 3, the amount of the precipitate is expressed by a relative value by taking the amount of the precipitate recovered after the electrolytic reduction for 6 hours as 100.

As is seen from FIG. 3, the precipitate is firstly formed after electrolytic reduction for 2 hours and no precipitate is formed without electrolytic reduction.

The precipitate was dispersed in neutral warm water and subjected to isoelectric precipitation at pH 4.5. The precipitate was washed with water, neutralized, heated at 140° C. for 20 seconds and dried to obtain a protein isolate mainly composed of 11S protein fraction. On the other hand, the dispersed fraction obtained in the electrolytic reduction was also subjected to isoelectric precipitation at pH 4.5 and the resulting precipitate was washed with water, neutralized, heated at 140° C. for 20 second and dried to obtain a protein isolate mainly composed of 7S protein fraction.

REFERENCE EXAMPLE 2

Defatted soybean was extracted with a 63 mM Tris HCl-buffer solution containing 10 mM beta-mercaptoethanol (pH 7.8) by stirring for 1 hour and centrifuged at 10,000 r.p.m. for 15 minutes to remove "okara". The extract was adjusted to pH 6.6 with 2N hydrochloric acid, cooled at 2° to 3° C. for 3 hours with ice cooling and centrifuged at 10,000 r.p.m. for 20 minutes to obtain an insoluble fraction mainly composed of 11S protein fraction and a soluble fraction mainly composed of 7S protein fraction. The insoluble fraction was dissolved in a phosphate buffer (pH 7.6) and subjected to isoelectric precipitation. The resulting precipitate was washed with water and neutralized to obtain a protein fraction mainly composed of 11S protein fraction. The soluble fraction was subjected to isoelectric precipitation to remove whey and the precipitate was washed with water and neutralized to obtain a protein fraction mainly composed of 7S protein fraction.

EXPERIMENT 2

Figure 4:
FIG. 4 is SDS-polyacrylamide gel electrophoresis pattern of the protein fraction obtained in Example 4 hereinafter.
Figure 5:
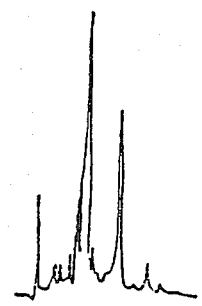
FIG. 5 is SDS-polyacrylamide gel electrophoresis pattern of the protein fraction obtained in Reference Example 2 hereinafter.
Figure 6:
FIG. 6 is SDS-polyacrylamide gel electrophoresis pattern of an acid precipitated protein fraction.

The protein isolate mainly composed of 11S protein fraction obtained in Example 4 and the fraction mainly composed of 11S protein fraction obtained in Reference Example 2 were subjected to SDS-polyacrylamide electrophoresis according to Laemmly, U.K., Nature, 227, 680, 1970 and Weber, K. and Osborn, M , J. B. C, 244, 4406, 1969. The electrophoresis patterns are shown in FIGS. 4 and 5.

As a reference, SDS-polyacrylamide electrophoresis pattern of acid precipitated protein obtained from soymilk as in Example 4 by isoelectric precipitation and washing with water.

According to staining of the electrophoresis patterns, it was determined that the protein isolate mainly composed of 11S protein fraction of Example 4 contains 88% by weight of 11S protein fraction and the protein isolate mainly composed of 7S protein fraction of Example 4 contains 88% by weight of 7S protein fraction.

EXAMPLE 5

Soymilk was treated according to the same procedure as in Example 4 except that SBS was added to soymilk.

When the yield of a protein isolate mainly composed of 11S protein fraction was expressed as a relative value by taking that of after 6 hour electrolytic reduction in Example 4 as 100, in case of using 10 mg of SBS/100 ml of soymilk, it was 14 before electrolytic reduction, 56 after electrolytic reduction for 2 hours and 100 after electrolytic reduction for 4 hours. In case of using 60 mg of SBS/100 ml of soymilk, it was 75 before electrolytic reduction and 100 after electrolytic reduction for 2 hours. That is, by using SBS, the efficiency of electrolytic reduction is improved, even if the electrolytic reduction time is decreased. Further, it has been found that the amount of SBS to be used and, therefore, the amount of SBS remaining in a product can be reduced by the electrolytic reduction treatment.

EXAMPLE 6

Soymilk was treated according to Example 4 except that cysteine was added to soymilk. The same yield of the protein isolate mainly composed of 11S protein fraction as that after electrolytic reduction for 6 hours in Example 4 was obtained after electrolytic reduction for 5 hours in case of using 10 mg of cysteine /100 ml of soymilk or after electrolytic reduction for 3 hours in case of using 30 mg of cysteine/100 ml of soymilk.

What is claimed is:

1. A method for fractionation of a vegetable protein which comprises dispersing a source of the vegetable protein containing insoluble carbohydrate in an aqueous system at pH of 7.1 to 9 under reduction conditions with
   (a) at least 0.5% by weight of a sulfite compound based on the source,
   (b) at least 5 m moles of a glutathione compound per 100 g of the source, or
   (c) at least 5 m moles of a cysteine compound per 100 g of the source without the addition of sodium chloride and then bringing the resulting mixture to pH 5.5 to 7.0 at a temperature of 20° C. or lower to fractionate the mixture into a soluble or dispersing fraction and an insoluble or precipitate fraction accompanied by the insoluble carbohydrates.

2. A method according to claim 1, wherein the vegetable protein is soybean protein.

3. A method according to claim 1, wherein the sulfite compound is selected from a group consisting of sulfurous acid, alkali metal sulfites, ammonium sulfite, alkali metal bisulfites, ammonium bisulfite, alkali metal pyrosulfites, ammonium pyrosulfite, alkali metal metabisulfites, ammonium metabisulfite and sulfur dioxide.

4. A method according to claim 1, wherein a glutathione compound or a cysteine compound is selected from the group consisting of glutathione, glutathione hydrochloride, cysteine and cysteine hydrochloride.

5. A method according to claim 1, wherein the method further comprises isolating the insoluble fraction, and dispersing it in warm water to remove a precipitate.

6. A method according to claim 1, wherein the method further comprises isolating the soluble fraction, subjecting it to isoelectric precipitation, separating a precipitate, neutralizing it, heating and then drying it.

7. A method for fractionation of a vegetable protein composed of 7S and 11S protein fractions which comprises subjecting a source of the vegetable protein containing insoluble carbohydrate in an aqueous system to electrolytic reduction and then bringing the system to pH 5.5 to 7.0 and the temperature to 20° C. or lower to fractionate the system into a soluble or dispersing fraction and an insoluble or precipitate fraction.

8. A method according to claim 7, wherein the vegetable protein is soybean protein.

9. A method according to claim 7, wherein the electrolytic reduction is carried out in the presence of a sulfite compound, a sulfate compound, a glutathione compound or a cysteine compound.

10. A method according to claim 9, wherein the sulfite compound is selected from a group consisting of sulfurous acid, alkali metal sulfites, ammonium sulfite, alkali metal bisulfites, ammonium bisulfite, alkali metal pyrosulfites, ammonium pyrosulfite, alkali metal metabisulfites, ammonium metabisulfite and sulfur dioxide.

11. A method according to claim 9, wherein the sulfate compound, the glutathione compound or the cysteine compound is selected from the group consisting of sodium sulfate, glutathione, glutathione hydrochloride, cysteine and cysteine hydrochloride.

* * * * *